(12) United States Patent
Amakusa

(10) Patent No.: US 7,045,982 B2
(45) Date of Patent: May 16, 2006

(54) DRIVING CIRCUIT FOR BRUSHLESS MOTOR

(75) Inventor: Hideki Amakusa, Tokai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/865,282

(22) Filed: Jun. 10, 2004

(65) Prior Publication Data
US 2005/0017662 A1 Jan. 27, 2005

(30) Foreign Application Priority Data
Jul. 25, 2003 (JP) .............................. 2003-279541

(51) Int. Cl.
H02K 23/00 (2006.01)
H02P 1/18 (2006.01)
H02P 3/08 (2006.01)
H02P 5/06 (2006.01)
H02P 7/06 (2006.01)

(52) U.S. Cl. ...................... 318/254; 318/432; 318/434; 318/722; 318/700

(58) Field of Classification Search ................ 318/254, 318/434
See application file for complete search history.

(56) References Cited

U.S. PATENT DOCUMENTS

| | | | | |
|---|---|---|---|---|
| 5,592,058 A * | 1/1997 | Archer et al. | ................ | 318/254 |
| 6,107,926 A * | 8/2000 | Kifuku et al. | ............... | 340/650 |
| 6,170,241 B1 * | 1/2001 | Shibilski et al. | ............. | 56/11.9 |
| 6,170,509 B1 * | 1/2001 | Karta | ........................ | 137/78.4 |
| 6,177,774 B1 * | 1/2001 | Iwashita et al. | ............ | 318/434 |
| 6,359,405 B1 * | 3/2002 | Tsurumi | ..................... | 318/434 |

* cited by examiner

*Primary Examiner*—David Martin
*Assistant Examiner*—Erick Glass
(74) *Attorney, Agent, or Firm*—Posz Law Group, PLC

(57) ABSTRACT

A driving circuit for a brushless motor includes a current sensor for detecting alternating phase-current flowing in one of the phase coils, a switching driver for supplying each phase-coil with prescribed alternating phase-current, a reference value setting circuit which provides a reference value which changes in synchronism with the prescribed phase-current to be larger than the same and an abnormality determining circuit which determines abnormality if the current detected by the current sensor is larger than the reference value.

3 Claims, 6 Drawing Sheets

DRIVING CIRCUIT FOR BRUSHLESS MOTOR

CROSS REFERENCE TO RELATED APPLICATION

The present application is based on and claims priority from Japanese Patent Application 2003-279541, filed Jul. 25, 2003, the contents of which are incorporated herein by reference.

BACKGROUND OF THE INVENTION

1. Field of the Invention

The present invention relates to a driving circuit for a brushless motor that can detect short-circuiting of the motor.

2. Description of the Related Art

An ordinary brushless motor is widely used as a driving motor in various fields, such as a fan motor mounted in an in-house unit of an air conditioner or a steering motor of an electric power steering device. Such a brushless motor includes a permanent magnet type rotor, a stator having a plurality of driving coils, a plurality of position sensors disposed around the rotor and a driving circuit. In order to rotate the rotor, the angular position of the rotor is detected by the position sensors to cyclically and timely excite the driving coils.

As disclosed in JP-A-Hei-10-191551 or U.S. Pat. No. 6,107,926 that is a counterpart of the Japanese patent application, a current sensor is disposed in the driving circuit to detect a short-circuiting problem of the brushless motor. If a short-circuiting problem takes place, the current sensor detects an amount of current that is larger than a predetermined fixed value (e.g. 60 A in FIG. 5).

Because driving current or load current of the brushless motor changes as the electric angle of the rotor of the brushless motor changes, the current sensor may not correctly detect short-circuiting problem if the rotor is positioned at an angle (e.g. 150 degree in electric angle in FIG. 5) where the driving current becomes smaller than the predetermined fixed value. In that case, various parts or components may be damaged by a large amount of short-circuiting current before it is detected.

SUMMARY OF THE INVENTION

Therefore, an object of the invention is to provide a driving circuit for a brushless motor that can correctly detect short-circuiting problems.

Another object of the invention is to provide an inexpensive driving circuit for a brushless motor.

According to a main feature of the invention, a driving circuit for a brushless motor includes a current sensor for detecting alternating phase-current flowing in one of the phase coils, first means for setting a reference value whose amount changes to be larger than the alternating phase-current and, and second means for determining abnormality if an amount of the phase-current detected by the current sensor is larger than the reference value.

In the above driving circuit, the first means may include a rotation sensor for detecting an electric angle of the rotor to the phase-coils and third means for setting the reference value that changes according to the electric angle of the motor. The second means may determine abnormality if an amount of the phase-current detected by the current sensor continues to be larger than the reference value for a predetermined time.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
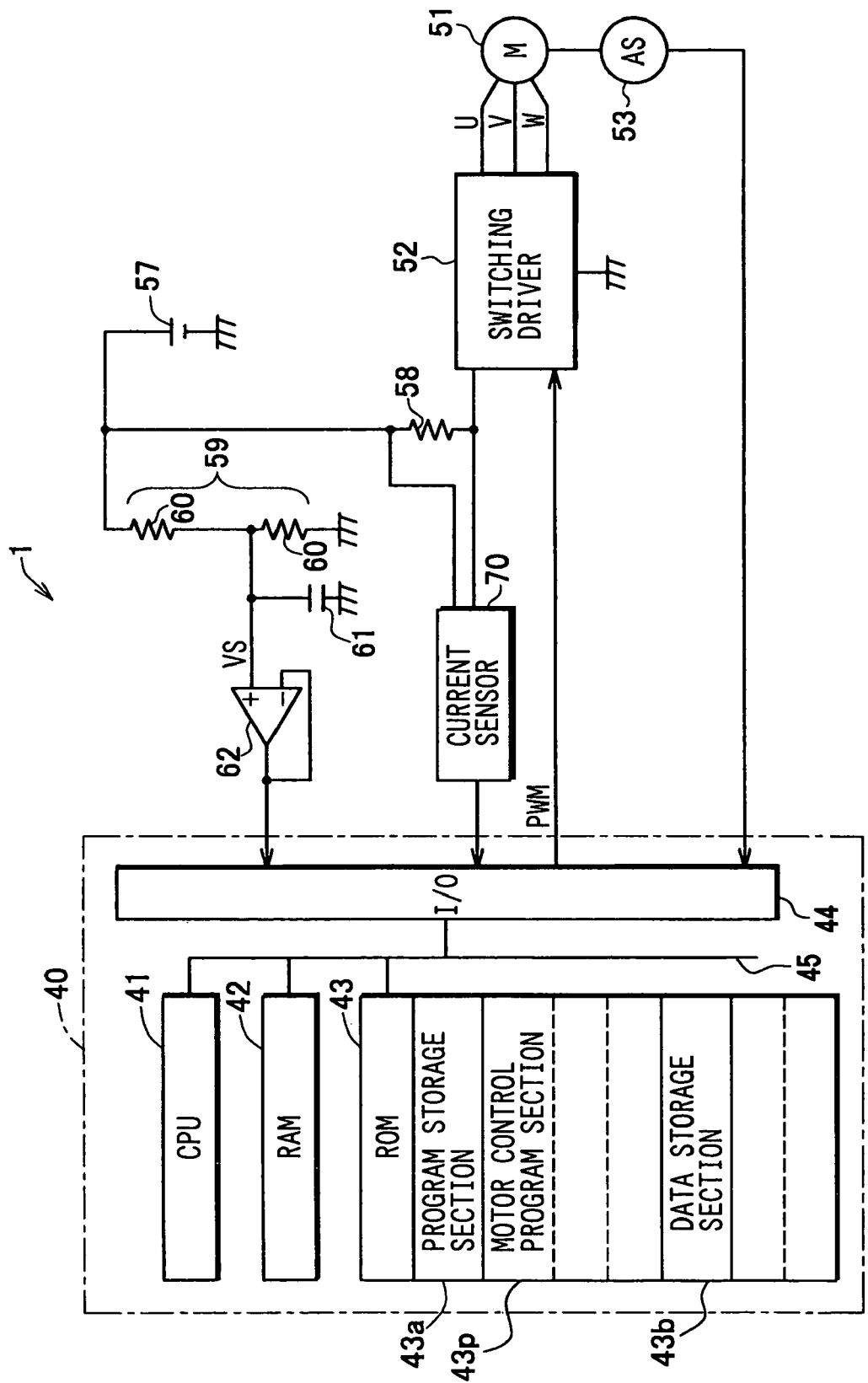
FIG. 1 is a circuit diagram that includes a brushless motor and a driving circuit according to the first preferred embodiment of the invention.
Figure 2A:
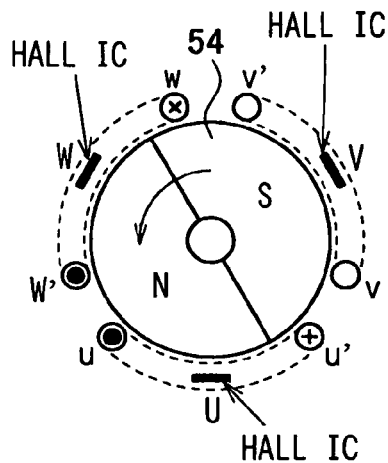
FIGS. 2A–2F are schematic diagrams illustrating operation of the brushless motor.
Figure 2D:
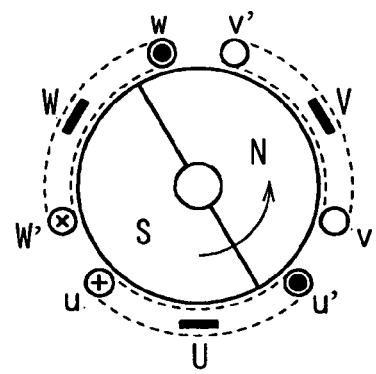
Figure 2B:
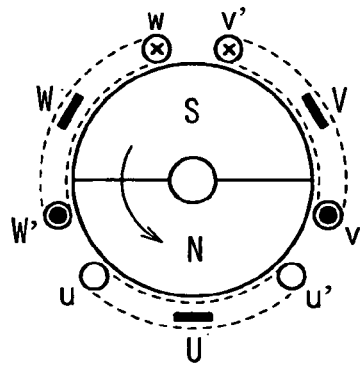
Figure 2E:
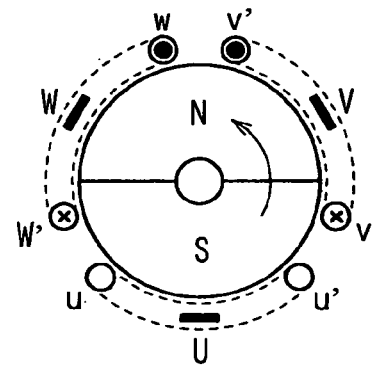
Figure 2C:
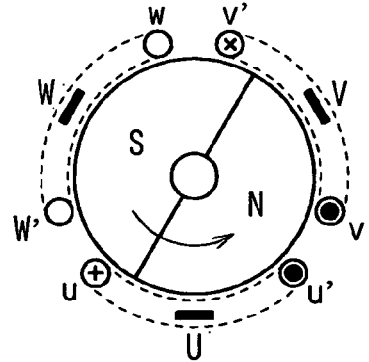
Figure 2F:
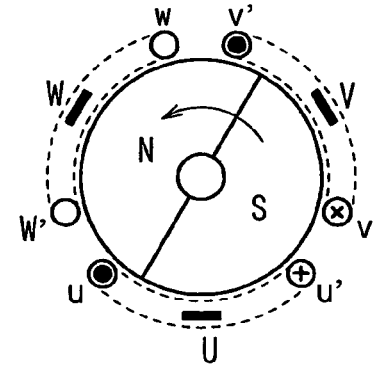

As shown in FIG. 1, a driving circuit 1 for a brushless motor 51 according to the first preferred embodiment of the invention includes a motor control circuit 40, a switching driver 52, a motor's angular position sensor 53, a shunt resistor that is connected to a vehicle battery 57, a battery voltage sensor circuit VS that includes voltage dividing resistors 60, a capacitor 61 and a voltage follower circuit 62, a current sensor unit 70, etc.

The motor control circuit 40 includes a CPU 41, a RAM 42, a ROM 43, an I/O interface circuit 44, bus lines 45, a etc., which are common and well-known. The CPU 41 controls the brushless motor 51 according to programs and data that are stored in the RAM 42 and the ROM 43. The ROM 43 includes a program storage section 43a and a data storage section 43b. The program storage section 43a stores a motor control program 43p in it.

The motor control circuit 40 calculates a necessary amount of torque of the brushless motor 51 according to the motor control program 43p and battery voltage and provides a pulse voltage signal for a PWM (pulse width modulation) control, which is applied to the switching driver 52 to drive the brushless motor 51. The motor control circuit 40 also calculates an actual amount torque of the brushless motor 51 from an amount of motor current that is sensed by the current sensor unit 70 and feedback-controls so that the actual amount of torque can equal the necessary amount of torque.

The brushless motor 51 is a three-phase type motor that has a permanent magnet type rotor 54 and three phase stator coils U, V, W that are disposed in the circumferential direction at 120 degrees in electric angle, as shown in FIG. 2. The angular position sensor 53 is comprised of a plurality of hall IC elements respectively disposed in the phase coils U, V, W. The switching driver 52 cyclically changes supply of current to the phase coils U, V, W to rotate the rotor 54 in a normal direction. Incidentally, the order of the current supply is reversed if the rotor 54 of the brushless motor 51 is to be reversed.

Figure 3:
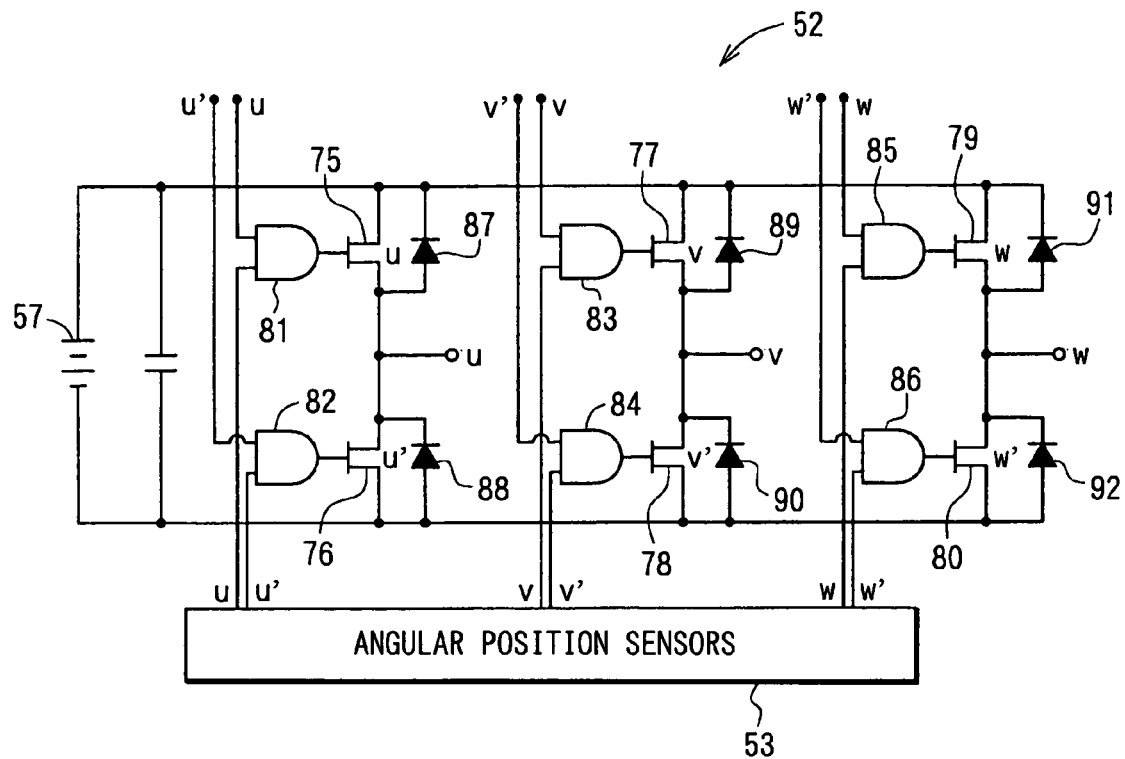
FIG. 3 is a circuit diagram of a switching driver that is included in the driving circuit.

When the switching driver 52 cyclically supplies current to the phase coils U, V, W, the motor control circuit 40 supplies the PWM signal to them at the same sequence. As shown in FIG. 3, the switching driver 52 includes a H-shaped bridge circuit of six FETs 75–80, six AND gates 81–86 and six flywheel diodes 87–92. Each of the FETs 75–80 corresponds to one of wire ends u, u', v, v', w, w'. Each of the AND gates 81–86 provides a logical product of a signal provided by the motor control circuit 40 and a signal provided by the angular position sensor 53. Each of six flywheel diodes 87–92 is connected to one of the FETs 75–80 so as to bypass induction current caused by the switching operation of the switching driver 52. Each of the FETs 75–80 selectively turns on or off when one of the output signal (logical sum) of the AND gates 81–86 is applied to the gate thereof.

Figure 4:
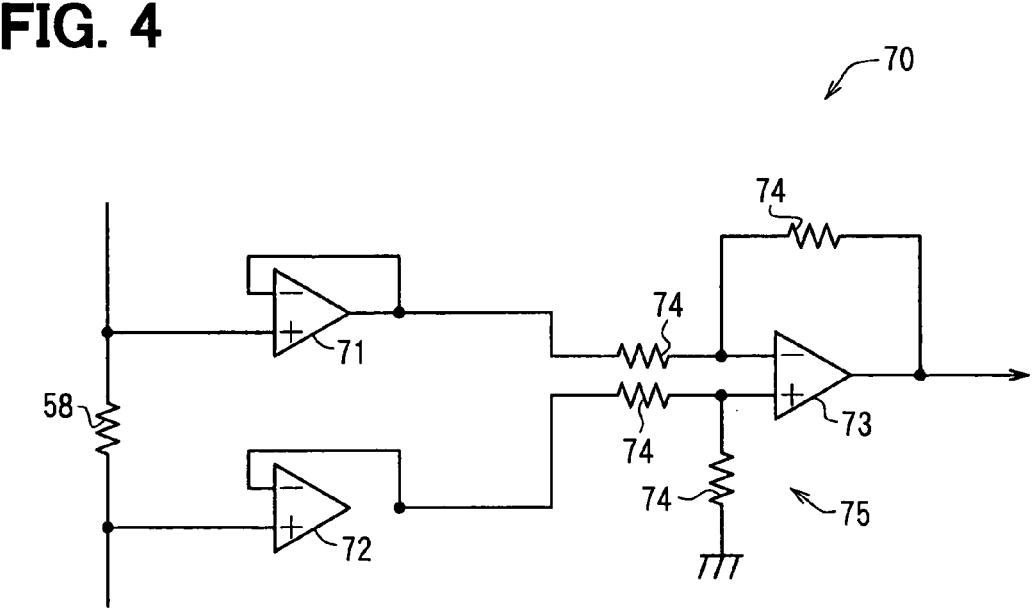
FIG. 4 is a circuit diagram of a current sensor circuit that is included in the driving circuit.

As shown in FIG. 1, the current sensor unit 70 detects a voltage drop in the shunt resistor 58 when current flows from the vehicle battery 57 to the motor 51 and sends a voltage-drop signal to an A/D port of the I/O interface circuit 44. As shown in FIG. 4, the current sensor unit 70 includes a pair of voltage follower circuits 71, 72, a voltage differential amplifier circuit 73 and resistors 74 connected to the voltage follower circuits 71, 72. The voltage across the shunt resistor 58 is amplified by the differential amplifier 73 to provide a voltage signal that is proportional to the current flowing through the shunt resistor 58. The current sensor unit may include a probe, such as a Hall IC element or a current detecting coil, instead of the shunt resistor 58.

The angular position sensor 53 detects the angular position or rotation position of the motor 51. The angular position sensor 53 is a well-known type sensor, such as a rotary encoder or a resolver. The motor control circuit 40 calculates an electric angle of the motor 51 from the output signal of the angular position sensor 53. Incidentally, there is the following relationship between the electric angle θe of the motor 51 and the mechanical angle θm thereof.

$$\theta e = (k/2) \times \theta m,$$

wherein k represents the number of magnetic poles of the rotor 54 that is equal to or larger than 2. In the brushless motor 51 shown in FIG. 2, the electric angle θe is the same as the mechanical angle θm because k is 2.

Figure 7:
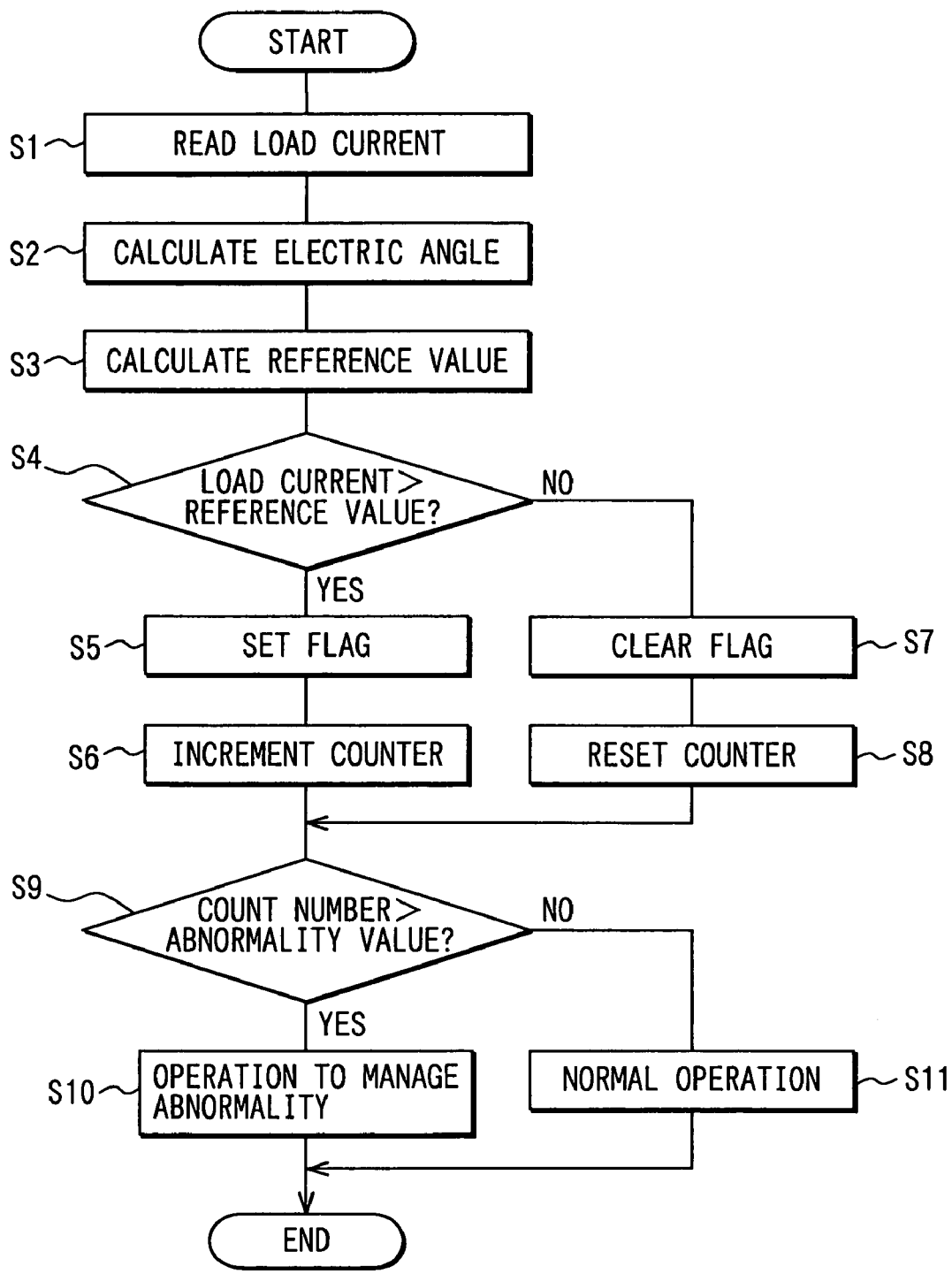
FIG. 7 is a flow diagram of operation of the driving circuit.

Operation of the motor control circuit in case that abnormal current flows in the phase coils of the motor will be described with reference to a flow diagram shown in FIG. 7.

Figure 5:
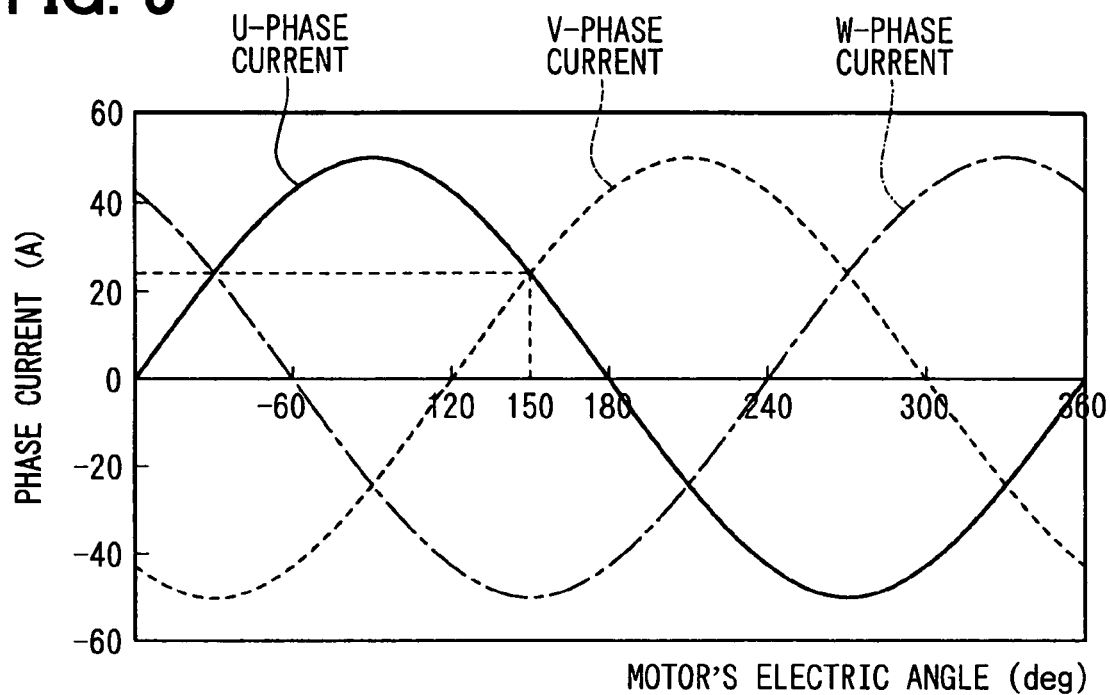
FIG. 5 is a graph showing a relationship between the electric angle of the brushless motor and the driving current thereof.

At step S1, the current sensor unit 70 measures respective amounts of current flowing in the phase coils U, V, W, as shown in FIG. 4. Incidentally, the phase-current flowing in each of the phase coils U, V, W has 120 degrees in electric angle different from another, as shown in FIG. 5.

Then, the angular position sensor 53 detects the rotation angle of the rotor 54 and outputs an electric angle at step S2. Subsequently, each reference value of the current for the phase coils U, V, W is calculated from the electric angle by means of the following formulas:

$$U\text{-phase-current reference value} = A + \text{abs}(\sin \theta e \times B) \quad (1)$$

$$V\text{-phase-current reference value} = A + \text{abs}((\sin \theta e - 120) \times B) \quad (2)$$

$$W\text{-phase-current reference value} = A + \text{abs}((\sin \theta e + 120 \times B) \quad (3),$$

wherein A represents an offset value, B represents an adjustment factor and "abs" means an absolute value.

Figure 6:
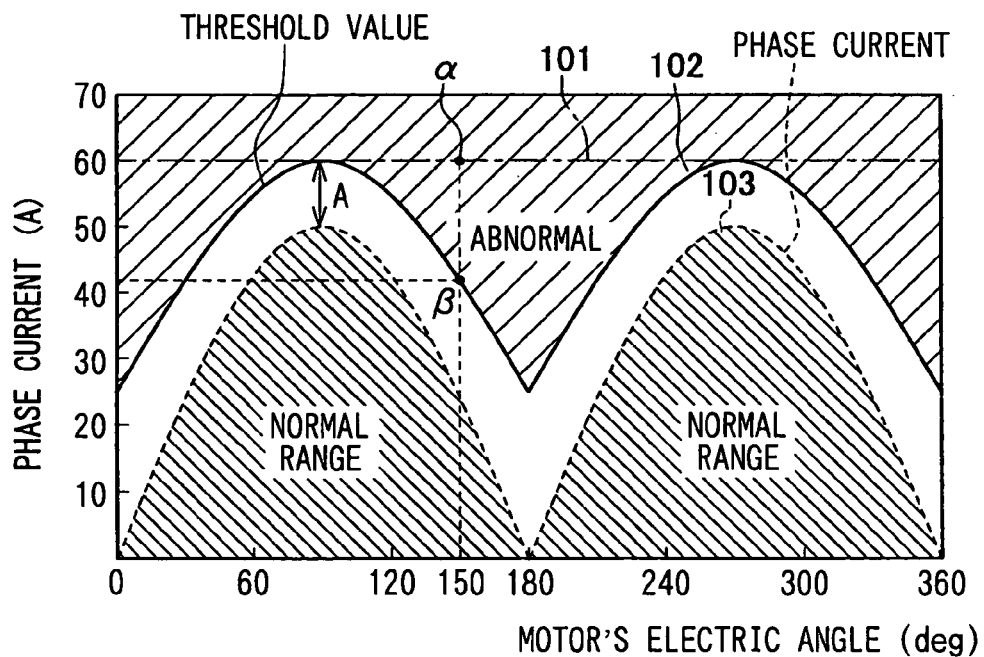
FIG. 6 is a graph showing normal and abnormal ranges of the brushless motor.

The reference values are shown in FIG. 6. The reference values can be also calculated according to a data table that is stored in the data storing section 43b.

At step S4, an amount of current flowing in the U-phase coil that is measured by the current sensor unit 70 is compared with the U-phase-current reference value, an amount of current flowing in the V-phase coil that is measured by the current sensor unit 70 is compared with the V-phase-current reference value, and an amount of current flowing in the W-phase coil that is measured by the current sensor unit 70 is compared with the W-phase-current reference value.

If the amount of current flowing in any one of the phase coils U, V, W is larger than the corresponding reference value (e.g. if U-phase current becomes 42 A at 150 degrees in electric angle at point β in FIG. 6), YES is provided to set an abnormality flag at step S5. Subsequently, an abnormality checking counter is incremented at step S6. If the amount of current flowing in any one of the phase coils U, V, W is not larger than the corresponding reference value on the other hand, NO is provided at step S4 to clear the abnormality flag at step S7. Subsequently, the abnormality checking counter is reset at step S8. In the meanwhile, if the reference value is constant irrespective of the electric angle, such as 60 amperes at point α in FIG. 6, it would be impossible to detect abnormality if the U-phase current becomes 42 A at 150 degrees in electric angle point β in FIG. 6.

At step S9, the count number of the abnormality checking counter is compared with a predetermined value that indicates an abnormality, such as a value corresponding to 25 milliseconds. If the count number is larger than the predetermined value, YES is provided to stop or control the motor to manage an abnormality. On the other hand, NO is provided to control the motor to run a normal operation at step S11 if the counter number is not larger than the predetermined value.

Figure 8:
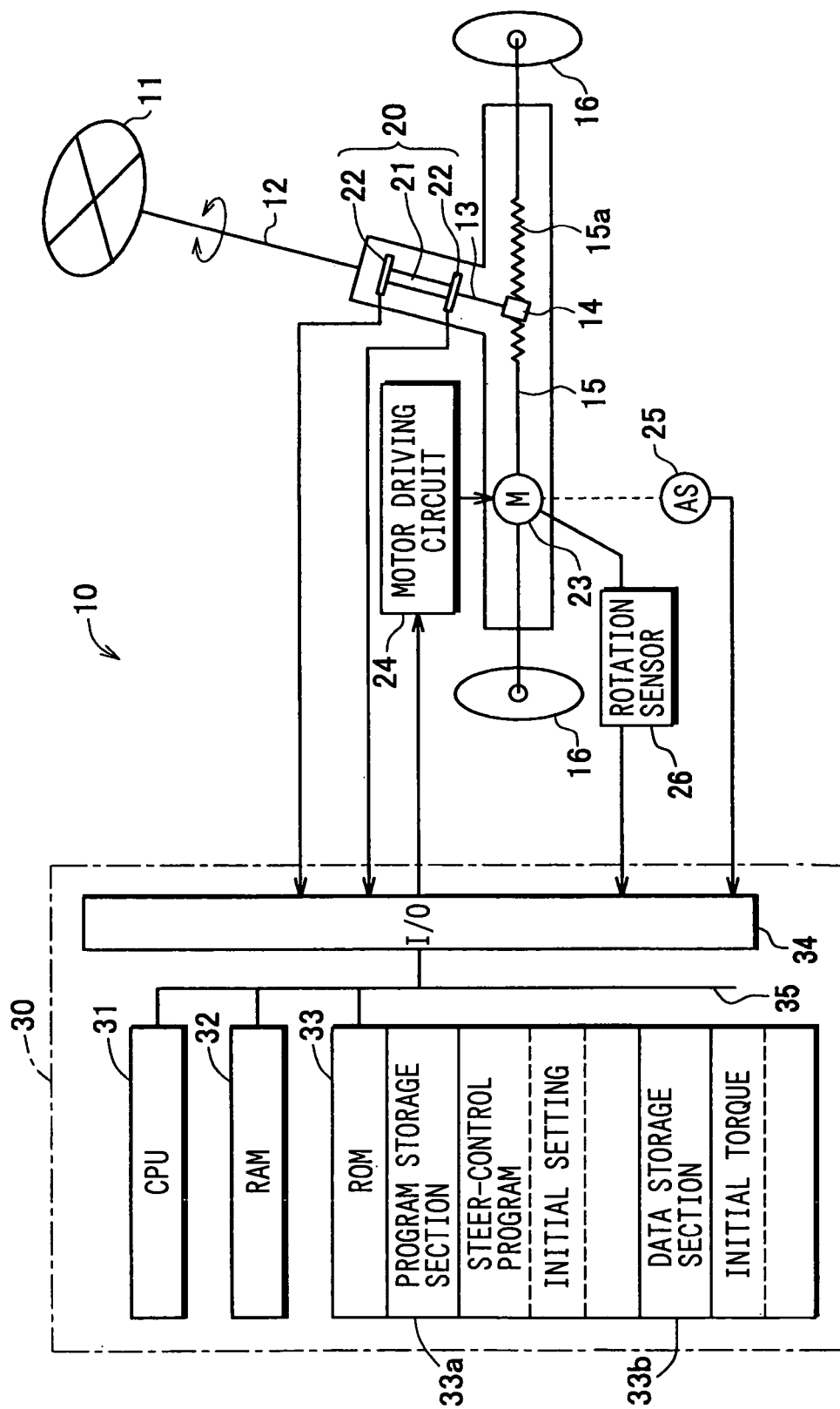
FIG. 8 is an electric power steering system that includes a brushless motor with a driving circuit according to the second preferred embodiment.

A driving circuit for the brushless motor according to the second preferred embodiment of the invention will be described with reference to FIG. 8. The driving circuit is adopted into a motor-driven power steering system.

The motor-driven power steering system 10 includes a steering wheel 11 that includes a steering shaft 12, a pinion shaft 13 that includes a pinion 14, a rack bar 15 that includes rack teeth 15a, a a torque sensor 20, steer-assisting motor 23, a driving circuit 24, a rotation sensor 25, a current sensor 26 and a steering control circuit 30. The pinion 14 engages the rack teeth 15a formed on the rack bar 15, whose opposite ends are connected to wheels 16 of a vehicle. The pinion shaft 12 is connected to the steering shaft 12 to rotate the pinion 14, thereby reciprocating the rack bar 15 to move the wheels 16 when the steering wheel 11 is steered. The steer-assisting motor 23 assists the pinion shaft 13 to rotate the pinion 14.

The torque sensor 20 is disposed between the steering shaft 12 and the pinion shaft 13. The torque sensor 20 includes a torsion bar 21 that has a prescribed spring constant and a pair of resolvers 22, 23 disposed at opposite ends of the torsion bar 21. When the torsion bar 21 is twisted by a torque, the pair of resolvers 22, 23 detects a twisted angle or a difference in angle between the opposite ends of the torsion bar 21. The amount of the torque is calculated from the twisted angle and the spring constant of the torsion bar 21.

The steering control circuit 30 has substantially the same structure and function as the motor control circuit 40 of the previous embodiment of the invention. The steering control circuit 30 has a CPU 31, a RAM 32 and a ROM 33 and executes a steering control program that is stored in the ROM 33 to calculate a driving torque from a torque applied to the torsion bar 21, which is detected by the torque sensor 20. The steering control circuit 30 controls the motor driving circuit 24 to supply the steer-assisting motor 23 with a PWM-voltage signal and calculates actual torque from actual motor current that is detected by the current sensor 26 to carry out feed-back control of the driving torque. The steering control circuit 30 also detects abnormal motor current by means of the rotation sensor 25 and the current sensor.

Thus, the operation of the power steering system 10 is controlled to be safe even if the steer-assisting motor 23 fails.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A driving circuit for a brushless motor including a plurality of phase-coils a switching driver for supplying each phase coil with prescribed alternating phase-current and a permanent magnet rotor, said driving circuit comprising:
    a current sensor for detecting current flowing in one of the phase coils;
    first means for setting a reference value whose amount changes to be larger than the prescribed alternating phase-current; and
    second means for determining abnormality if the current detected by said current sensor is larger than the reference value,
    wherein said first means comprises a rotation sensor for detecting an electric angle of the rotor to the phase-coils and third means for setting the reference value according to the electric angle.

2. A driving circuit for a brushless motor that includes a plurality of phase-coils and a permanent magnet rotor, said driving circuit comprising:
    a switching driver for supplying each of said phase coils with prescribed alternating phase-current;
    a current sensor for detecting current flowing in one of the phase coils;
    first means for setting a reference value whose amount is larger than the prescribed phase-current and changes in synchronism with the prescribed phase-current; and
    second means for alarming if the current flowing in one of the phase current continues to be larger than the reference value for a predetermined time,
    wherein said first means comprises a rotation sensor for detecting an electric angle of the rotor to the phase-coils and third means for setting the reference value according to the electric angle.

3. A driving circuit for a brushless motor that includes a plurality of phase-coils and a permanent magnet rotor, said driving circuit comprising:
    means for supplying each of said phase coils with prescribed alternating phase-current;
    means for detecting current flowing in one of the phase coils;
    means for setting a reference value which is a fixed value larger than the prescribed alternating phase-current; and
    means for alarming if the current detected by said means for detecting is larger than the reference value, wherein
    said means for setting a reference value comprises first means for detecting an electric angle of the permanent magnet rotor to the phase coils and second means for setting the reference value according to the electric angle.

* * * * *